United States Patent
Thibault et al.

(10) Patent No.: US 10,414,409 B2
(45) Date of Patent: Sep. 17, 2019

(54) METHOD FOR DETERMINING A DANGEROUS DRIVING INDICATOR OF A VEHICLE

(71) Applicant: IFP Energies nouvelles, Rueil-Malmaison (FR)

(72) Inventors: Laurent Thibault, Courbevoie (FR); Philippe Moulin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/738,490

(22) PCT Filed: May 27, 2016

(86) PCT No.: PCT/EP2016/062080
§ 371 (c)(1),
(2) Date: Dec. 20, 2017

(87) PCT Pub. No.: WO2016/206913
PCT Pub. Date: Dec. 29, 2016

(65) Prior Publication Data
US 2018/0178809 A1 Jun. 28, 2018

(30) Foreign Application Priority Data
Jun. 26, 2015 (FR) .................................. 15 55924

(51) Int. Cl.
*B60W 40/06* (2012.01)
*B60K 23/08* (2006.01)
(Continued)

(52) U.S. Cl.
CPC ............ *B60W 40/09* (2013.01); *B60K 28/02* (2013.01); *B60K 28/16* (2013.01); *B60W 30/18009* (2013.01); *B60W 40/10* (2013.01); *B60W 40/103* (2013.01); *B60W 50/14* (2013.01); *B60W 2050/0035* (2013.01); *B60W 2050/146* (2013.01); *B60W 2510/207* (2013.01); *B60W 2520/20* (2013.01); *B60W 2520/26* (2013.01); *B60W 2520/28* (2013.01);
(Continued)

(58) Field of Classification Search
None
See application file for complete search history.

(56) References Cited

U.S. PATENT DOCUMENTS 9,154,909 B2 * 10/2015 Fulger ................. G01C 21/3415
9,616,897 B2 *  4/2017 Powers ................. B60W 40/06
(Continued)

FOREIGN PATENT DOCUMENTS

EP         1960829 A1      8/2008

OTHER PUBLICATIONS

International Search Report for PCT/EP2016/062080 dated Aug. 24, 2016; English translation submitted herewith (6 pages).

*Primary Examiner* — Thomas G Black
*Assistant Examiner* — Demetra R Smith-Stewart
(74) *Attorney, Agent, or Firm* — Fitch, Even, Tabin & Flannery LLP

(57) ABSTRACT

The present invention determines at least one dangerous driving indicator by use of a physical model based on the dynamics of a vehicle. According to the invention, a dynamic model of the vehicle determines a slip parameter of the vehicle, which deduces a representative dangerous driving indicator.

21 Claims, 3 Drawing Sheets

(51) Int. Cl.
*B60W 40/09* (2012.01)
*B60K 28/02* (2006.01)
*B60K 28/16* (2006.01)
*B60W 40/103* (2012.01)
*B60W 30/18* (2012.01)
*B60W 40/10* (2012.01)
*B60W 50/14* (2012.01)
*B60W 50/00* (2006.01)

(52) U.S. Cl.
CPC ..... *B60W 2530/16* (2013.01); *B60W 2530/20* (2013.01); *B60W 2550/12* (2013.01); *B60W 2550/13* (2013.01); *B60W 2550/148* (2013.01); *B60W 2550/406* (2013.01)

(56) References Cited

U.S. PATENT DOCUMENTS

| | | | |
|---|---|---|---|
| 2002/0198655 A1 | 12/2002 | Bevly et al. | |
| 2007/0127144 A1 | 6/2007 | Gao | |
| 2010/0241307 A1* | 9/2010 | Hara | B60C 11/00 701/33.4 |
| 2011/0112739 A1 | 5/2011 | O'Dea et al. | |
| 2014/0129106 A1* | 5/2014 | Matsuzaki | B60W 10/06 701/69 |
| 2015/0344038 A1* | 12/2015 | Stenneth | B60W 40/103 340/439 |
| 2016/0107540 A1* | 4/2016 | Zhang | B60K 7/0007 701/22 |
| 2016/0137208 A1* | 5/2016 | Powers | B60W 40/06 701/36 |

* cited by examiner

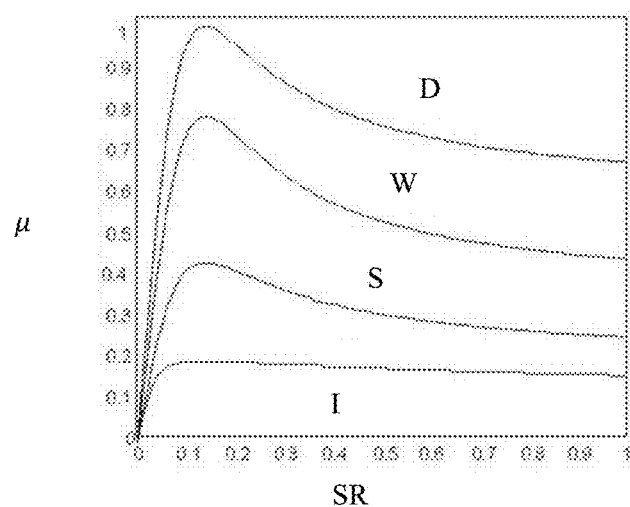
Figure 4
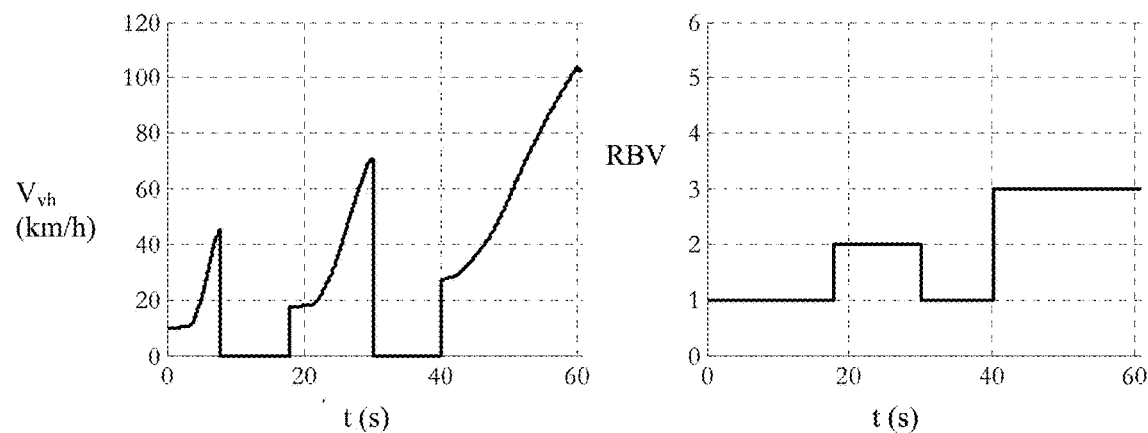
Figure 5a
Figure 5b
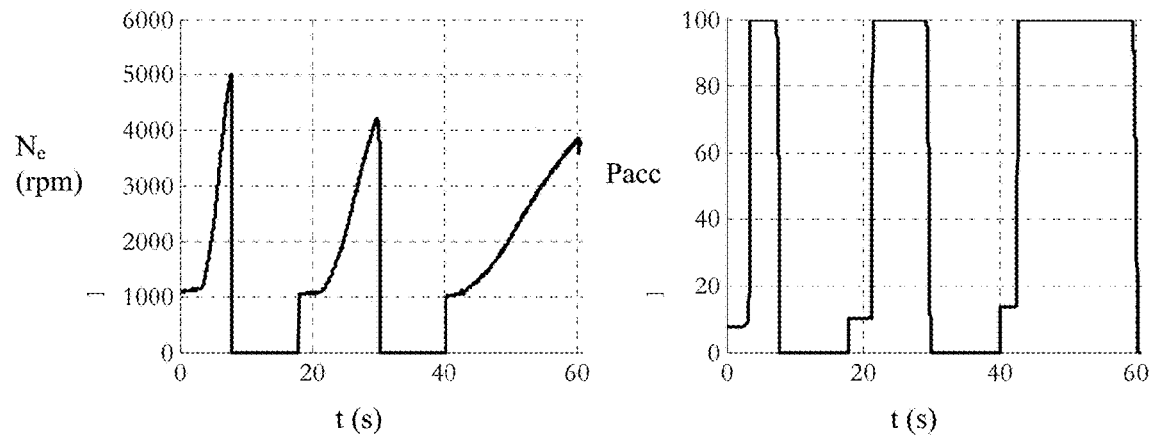
Figure 5c
Figure 5d

METHOD FOR DETERMINING A DANGEROUS DRIVING INDICATOR OF A VEHICLE

CROSS REFERENCE TO RELATED APPLICATION

Reference is made to French Patent Application No. 15/55.924, filed Jun. 26, 2015, which application is incorporated herein by reference in its entirety.

BACKGROUND OF THE INVENTION

Field of the Invention

The present invention relates to the field of vehicles, more particularly to the field of driving vehicles to limit dangerous driving situations.

Description of the Prior Art

Drivers and public authorities have always wished to reduce the number of accidents and therefore risky driving.

Moreover, automobile insurance companies have always sought to assess the loss expectancy of their policyholders, that is the probability of having an accident. Knowledge of this loss expectancy may enable insurers to adapt their services to each driver. This was historically assessed on purely statistical criteria, such as the age group or the type of vehicle driven.

Today, the emergence of connected vehicles and objects makes it possible to characterize dangerous driving from measurements. Indeed, a stand-alone box, a smartphone, a connection to the vehicle's on-board network, etc. are sufficient for having the position, and therefore the speed and acceleration of the vehicle available. In this context, new methods of assessing loss expectancy are possible.

The most common assessment method sets thresholds on the maximum value of the vehicle's acceleration. For example, EP patent application 1960829 describes one such method based on the vehicle's acceleration. However, this type of method, based solely on the speed or acceleration of the vehicle, is not always representative of dangerous driving. Indeed, a variation in speed or acceleration may be dependent on many external parameters, such as weather conditions, road traffic, the routes taken, etc. without reflecting dangerous driving.

On the academic side, modeling the dynamics of the vehicle is a well-known subject and there are numerous publications describing modelling of dynamics of the vehicle. The following works illustrate such modeling:

Kiencke U., & Nielsen L. Automotive Control Systems. For Engine, Driveline, and Vehicle, Springer, 2000.

Rajamani, R., Vehicle Control and Dynamics, Springer Science and Business Media, 2011.

But, while these approaches to modeling are very representative of the dynamics of the vehicle, they are not suitable for use in characterizing dangerous driving. Indeed, they require too many parameters describing the vehicle and especially too many measurements. They are therefore suitable only for research work in which vehicles are heavily instrumented but are unsuitable for mass production vehicles on which the sensor technical definition is reduced to the minimum.

SUMMARY OF THE INVENTION

The present invention determines at least one dangerous driving indicator by use of a simple physical model based on the dynamics of the vehicle. According to the invention, the dynamic model of the vehicle makes possible determination of a slip parameter of the vehicle, which is used to deduce a representative dangerous driving indicator. One of the objectives of the method according to the invention is to obtain a more representative and more robust method than the heuristic approaches based simply on acceleration thresholds.

The invention is a method for determining a dangerous driving indicator of a vehicle. The following steps are performed for this method:
a) at least one of the position and the altitude of the vehicle is measured;
b) a dynamic model of the vehicle is constructed that links at least one of the position and the altitude of the vehicle to at least one slip parameter of the vehicle;
c) at least one slip parameter of the vehicle is determined by use of the dynamic model and at least one of the measured position and altitude; and
d) at least one dangerous driving indicator of the vehicle is determined by use of the slip parameter.

According to the invention, at least one of the position and/or the altitude of the vehicle is measured by use of a geolocation system.

In accordance with one implementation of embodiment of the invention, prior to the step of determining a slip parameter, preprocessing of at least one of position andlar altitude measurements is performed, by use of at least one of oversampling and filtering.

Advantageously, the dynamic model of the vehicle is a model in which the width of the vehicle is disregarded.

According to one embodiment, the at least slip parameter of the vehicle is at least one of the lateral slip angle β of the vehicle and the longitudinal slip rate SR of the vehicle.

Preferably, the dynamic model of the vehicle determines the lateral slip angle β by a formula:

$$\beta(i) = \frac{v_{fy}(i) + v_{ry}(i)}{2 * v_L(i)}$$

with:
i being the instant of calculation,
$v_{fy}$ being the projection on the y axis of the speed of the front wheel,
$v_{ry}$ being the projection on the y axis of the speed of the rear wheel, and
$v_L$ being the projection on the longitudinal axis of the vehicle of the speed of the vehicle, the projections of the speeds being a function of the position of the vehicle.

Advantageously, the projections of the speed of the dynamic model is determined by relationships:

$$v_{ry}(i) = v_T(i) - l_r * \omega(i),$$
$$v_{fy}(i) = (v_T(i) + l_f * \omega(i)) * \cos\alpha(i) - v_L(i) * \sin\alpha(i),$$
$$\alpha(i) = \tan^{-1}\left(\frac{\omega(i) * (l_r + l_f)}{v_L(i)}\right),$$
$$v_L(i) = v_x(i) * \cos\psi(i) + v_y(i) * \sin\psi(i),$$
$$v_T(i) = -v_x(i) * \sin\psi(i) + v_y(i) * \cos\psi(i),$$
$$v_x(i) = \frac{x_{GPS}(i) - x_{GPS}(i-1)}{T_e},$$

-continued $$v_y(i) = \frac{y_{GPS}(i) - y_{GPS}(i-1)}{T_e},$$

$$\omega(i) = \frac{\psi(i) - \psi(i-1)}{T_e},$$

$$\psi(i) = \frac{180}{\pi} * \tan^{-1}\left(\frac{x_{GPS}(i) - x_{GPS}(i-1)}{y_{GPS}(i) - y_{GPS}(i-1)}\right),$$

with $x_{GPS}, y_{GPS}$ being the coordinates of the vehicle in the Lambert coordinate system, corresponding to the measured position of the vehicle, i being the instant of calculation, $T_e$ being the sampling period, $I_f$ being the distance between the center of gravity and the front wheels of the vehicle, and $I_r$ being the distance between the center of gravity and the rear wheels of the vehicle.

According to one feature of the invention, the dynamic model determines the slip rate SR of the vehicle by use of a mapping function for mapping the coefficient of adhesion of the vehicle and weather conditions.

In accordance with a variant embodiment, the coefficient of adhesion μ of the vehicle is determined by a formula:

$$\mu(i) = \frac{F_{driving}(i)}{F_z(i)}$$

with:

$$F_{res}(v) = C_{RR} + k * v + \frac{1}{2} * \rho_{air} * S * C_x * v^2,$$

$$F_{driving}(i) = M_{vehicle} * a_{veh}(i) + M_{vehicle} * g * \sin(\theta(i)) + F_{res}(v(i)),$$

$$F_z(i) = M_{vehicle} * g * \cos(\theta(i)),$$

$$\theta(i) = \tan^{-1}(\text{Slope}),$$

$$\text{Slope}(i) = \frac{\Delta h(i)}{\Delta d(i)},$$

$$\Delta h(i) = alt_{GPS}(i) - alt_{GPS}(i-1),$$

$$\Delta d(i) = \sqrt{[x_{GPS}(i) - x_{GPS}(i-1)]^2 + [y_{GPS}(i) - y_{GPS}(i-1)]^2},$$

with $x_{GPS}, y_{GPS}$ being the coordinates of the vehicle in the Lambert coordinate system, corresponding to the measured position of the vehicle, $alt_{GPS}$ being the measured altitude of the vehicle, i being the instant of calculation, $a_{veh}$ being the acceleration of the vehicle, $M_{vehicle}$ being the mass of the vehicle, $\rho_{air}$ being the density of the air, S being the front surface area of the vehicle, $C_x$ being the front aerodynamic drag coefficient of the vehicle, k being the coefficient of viscous friction, $C_{RR}$ being the rolling resistance coefficient of the vehicle, and g being the acceleration of gravity.

According to one implementation of the invention, the dangerous driving indicator is determined by determining at least one of the number of times and frequency of exceeding at least one threshold by the slip parameter.

According to one embodiment, the at least one dangerous driving indicator is at least one of displayed and recorded while the vehicle is being driven.

Advantageously, the at least one dangerous driving indicator is at least one displayed and recorded on the dashboard of the vehicle, on an Internet site, or on a standalone portable device such as a geolocation system or a mobile phone.

Preferably, the dynamic model of the vehicle takes into account at least one of the following conditions: the state of the highway, the weather conditions, the pressure and state of wear of the vehicle's tires, notably by use of mapping.

The invention also relates to a method for controlling a vehicle. The following steps are performed for this method:

a) at least one dangerous driving indicator is determined according to one of the preceding features; and b) the control of the vehicle is adapted according to the dangerous driving indicator.

Furthermore, the invention relates to a computer program product which is at least one of downloadable from a communication network, recorded on a tangible computer-readable medium and executable by a processor or a server, including program code instructions for implementing the method according to one of the preceding features, when the program is executed on at least one of a computer and on a mobile phone.

BRIEF DESCRIPTION OF THE DRAWINGS

Other features and advantages of the method according to the invention will appear on reading the description below of non-restrictive embodiments, referring to the appended figures and described below.

FIG. 4 illustrates a mapping of the longitudinal slip rate of the vehicle as a function of the coefficient of adhesion and weather conditions.

FIGS. 5a through 5d respectively represent curves for the speed, gear ratio, engine speed and position of the accelerator pedal as a function of time, for which tests are performed.

DETAILED DESCRIPTION OF THE INVENTION

Figure 1:
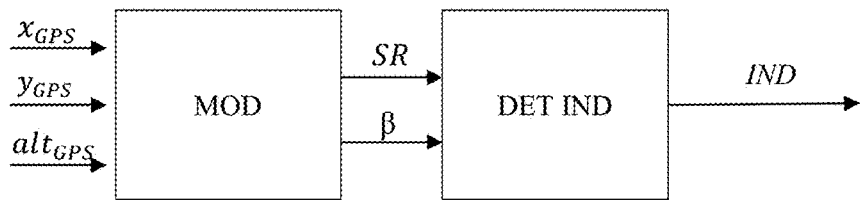
FIG. 1 illustrates the steps of the method for determining a dangerous driving indicator according to one embodiment of the invention.

The present invention relates to a method for determining at least one dangerous driving indicator of a vehicle. Driving is characterized as dangerous, if it might present a risk of accident, regardless of the cause of the risky behavior. The dangerous driving indicator makes it possible to quantify this dangerousness. According to the invention, the dangerous driving indicator is determined on the basis of the adhesion limit conditions of the vehicle, that is when the vehicle slips. Indeed, in these conditions, the loss expectancy increases. This indicator may be used by the driver to improve the driver's driving and make it safer, or by a controller which can automatically adapt the control of the vehicle, or by at least one of a vehicle insurance and rental/sharing organization in order to have information on their customer's driving.

Notations

The following notations are used in the rest of the description:

| | | |
|---|---|---|
| $(x_{GPS}, y_{GPS})$ | Coordinates measured by geolocation in the Lambert coordinate system | [m] |
| $alt_{GPS}$ | Altitude measured by geolocation | [m] |
| G | Center of gravity of the vehicle | [—] |
| $l_r$ | Distance between the center of gravity and the rear wheel axle | [m] |
| $l_f$ | Distance between the center of gravity and the front wheel axle | [m] |
| α | Turning angle of the front wheels | [rad] |
| ψ | Yaw angle | [rad] |
| θ | Road gradient angle | [rad] |
| $β_f$ | Lateral slip angle of the rear wheel | [rad] |
| $β_r$ | Lateral slip angle of the front wheel | [rad] |
| β | Lateral slip angle | [rad] |
| ω | Angular speed of the vehicle | [rad/s] |
| Te | Sampling period | [s] |
| μ | Coefficient of adhesion | [—] |
| SR | Longitudinal slip rate | [—] |
| v | Speed of the vehicle | [rad/s] |
| $v_x$ | Speed of the vehicle projected on the x axis | [m/s] |
| $v_y$ | Speed of the vehicle projected on the y axis | [m/s] |
| $v_T$ | Lateral speed of the vehicle | [rad/s] |
| $v_L$ | Longitudinal speed of the vehicle | [rad/s] |
| $F_{driving}$ | Tractive effort of the vehicle at the wheel | [N] |
| $F_{res}$ | Resultant of the efforts of friction undergone by the vehicle | [N] |
| $F_Z$ | Normal effort undergone by the vehicle (gravity) | [N] |
| $M_{vehicle}$ | Mass of the vehicle | [kg] |
| g | Acceleration of gravity (approximately 9.81 m/s$^2$) | [m/s$^2$] |
| SLOPE | Instantaneous gradient | [—] |
| $F_{driving}$ | Tractive force at the level of the ground-wheel contact | [N] |
| $F_{res}$ | Resultant of the forces of friction on the vehicle | [N] |
| $F_Z$ | Force of gravity of the vehicle | [N] |
| $a_{veh}$ | Instantaneous acceleration of the vehicle | [m/s$^2$] |
| i | Time increment of the calculations (i-1 corresponds to the preceding time) | [s] |

For these notations, the index r refers to the rear wheel, and the index f refers to the front wheel. The projections on the x and y axes of the Lambert coordinate system are denoted by the indices x and y.

The method according to the invention includes the following steps (the preprocessing step being optional):

1) Measuring at least one of position and altitude
2) Preprocessing the measurements
3) Constructing the dynamic model of the vehicle
4) Determining a slip parameter
5) Determining a dangerous driving indicator These steps may be performed in real time, during the movement of the vehicle.

FIG. 1 illustrates, non-restrictively, the method according to one embodiment of the invention. From measured data $(x_{GPS}, y_{GPS}, alt_{GPS})$ a dynamic model of the vehicle MOD determines at least one slip parameter of the vehicle. In the case of FIG. 1, the dynamic model MOD determines two slip parameters (β, SR). The slip parameters make it possible to determine an indicator IND by means of a step of determining a dangerous driving indicator (DET IND).

Figure 2:
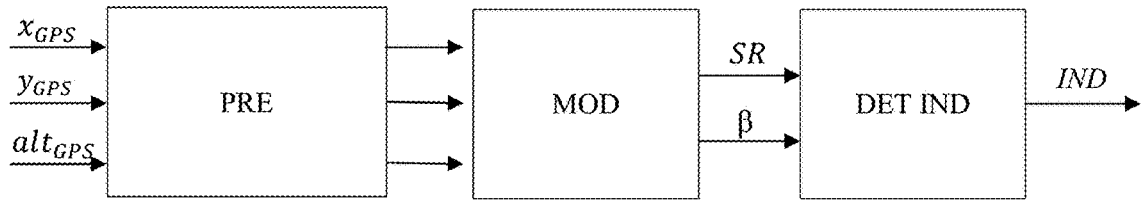
FIG. 2 illustrates the steps of the method for determining a dangerous driving indicator according to another embodiment of the invention.

FIG. 2 illustrates, non-restrictively, the method according to one alternative embodiment of the method illustrated in FIG. 1. The embodiment in FIG. 2 differs from that in FIG. 1 by a preliminary step of preprocessing PRE the measurements $(x_{GPS}, y_{GPS}, alt_{GPS})$.

1) Measuring at Least One of Position and Altitude

This step involves determining at least one of the position and the altitude of the vehicle. Preferably, position and altitude are measured, in order to obtain a plurality of slip parameters, which makes it possible to determine a reliable dangerous driving indicator. However, in order to simplify the method according to the invention, only the position, or only the altitude of the vehicle may be measured.

According to one embodiment of the invention, the (at least one of position and altitude) measurements are performed by use of a geolocation system, such as a satellite positioning system, such as the GPS (Global Positioning System) system, the Galileo system, etc. The geolocation system may, advantageously, be included in a mobile phone, of the smartphone type.

Taking into account the altitude notably allows a better estimate of slip, which makes it possible to obtain a more reliable dangerous driving indicator.

Advantageously, the position of the vehicle corresponds to the coordinates of the vehicle expressed in the Lambert coordinate system, which is a universal coordinate system which is the official projection used for maps.

2) Preprocessing the Measurements

This step is optional and is performed before determining at least one slip parameter (See FIG. 2). This step may be performed before or after the step of constructing the dynamic model.

The available (position and/or altitude) measurements for characterizing driving may come from a connected box, a smart phone, etc. Accordingly, their quality is variable and sometimes capable of improvement and it is preferable to ensure preprocessing before using them, in order to obtain a reliable indicator. This preprocessing may be variable, since it is dependent on the quality of the input data. In the most common case, preprocessing the measurements may be oversampling measurements, then filtering (for example by use of a low-pass filter). Alternatively, the preprocessing step may be only oversampling, or only in filtering.

3) Constructing the Dynamic Model of the Vehicle

A dynamic model of the vehicle is a model that links at least one slip parameter (the vehicle's tires) to the position and/or the altitude of the vehicle. The model takes into account the dynamics of the vehicle (speed, acceleration, etc.) for determining the slip of the vehicle, that is an unwanted and uncontrolled movement of the vehicle.

According to one embodiment of the invention, the dynamic model of the vehicle takes into account at least one, preferably all, of the following conditions which are the state of the highway, the weather conditions, the pressure and state of wear of the vehicle's tires, notably by use of mapping. This mapping may notably link the slip parameter to the coefficient of adhesion of the tires. Thus, the dangerous driving indicator is made more representative of dangerousness.

A slip parameter of the vehicle's tires may be the lateral slip angle of the vehicle, denoted by $\beta$. The lateral slip angle corresponds to the angle formed between the speed vector of the vehicle and the longitudinal axis of the vehicle.

Another slip parameter of the vehicle's tires may be the longitudinal slip rate, denoted by SR. The longitudinal slip rate reflects the slip of the wheel's tire with respect to the ground. This slip rate notably depends on the coefficient of adhesion of the tire on the ground.

According to one embodiment, it is assumed that the wheels remain in contact with flat ground. In addition, it is assumed that suspensions are rigid, which amounts to disregarding roll and pitch. Furthermore, the vehicle may be modeled by a "bicycle" type model. This amounts to considering that the width of the vehicle is negligible, and accordingly that the left and right wheels have a similar behavior.

Figure 3:
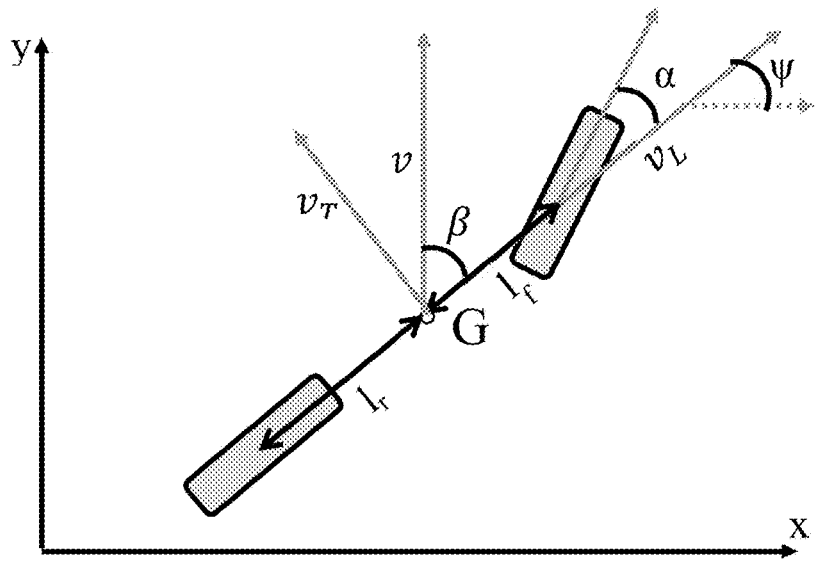
FIG. 3 illustrates a geometric parameterization of the vehicle for a dynamic model.

FIG. 3 schematically depicts the "bicycle" model, and the angles used for this embodiment. In this figure, only the wheels are represented. G represents the center of inertia of the vehicle. $I_f$ and $I_r$ respectively represent the distance between the center of gravity G and the front and rear axles. The reference system is defined by the (x,y) coordinate which corresponds to the Lambert coordinate system. v is the speed of the vehicle. $v_f$ and $v_r$ are respectively the speed of the front and rear wheel. $\beta$ is the lateral slip angle. $\beta_f$ and $\beta_r$ (not represented) correspond to the lateral slip angles of the front and rear wheels, respectively. $\psi$ is the yaw angle. $v_L$ and $v_T$ are the projections of the speed of the vehicle in the coordinate system associated with the vehicle chassis.

According to one variant embodiment of the invention, the position is measured and the slip parameter which is determined by the dynamic model is the lateral slip angle $\beta$. In this variant, the lateral slip angle $\beta$ may be determined by a formula:

$$\beta(i) = \frac{v_{fy}(i) + v_{ry}(i)}{2 * v_L(i)}$$

with:
i is the instant of calculation,
$v_{fy}$ is the projection on the y axis of the speed of the front wheel,
$v_{ry}$ is the projection on the y axis of the speed of the rear wheel, and
$v_L$ is the projection on the longitudinal axis of the vehicle of the speed of the vehicle, the projections of the speeds being a function of the position of the vehicle.

For this estimate of the lateral slip angle $\beta$, the following steps may be performed:

a) Calculation of the turning angle of the front wheels $\alpha$
In this section, the calculation of the turning angle of the front wheels $\alpha$ is described in detail.

The calculation of the yaw angle, from the (position) coordinates, may be obtained from the following equation:

$$\psi(i) = \frac{180}{\pi} * \tan^{-1}\left(\frac{x_{GPS}(i) - x_{GPS}(i-1)}{y_{GPS}(i) - y_{GPS}(i-1)}\right)$$

The angular speed of the vehicle may be given by a formula:

$$\omega(i) = \frac{\psi(i) - \psi(i-1)}{T_e}$$

The projections $v_x$ and $v_y$ of the speed v of the vehicle in the (x,y) reference frame may be given by:

$$v_x(i) = \frac{x_{GPS}(i) - x_{GPS}(i-1)}{T_e}$$

$$v_y(i) = \frac{y_{GPS}(i) - y_{GPS}(i-1)}{T_e}$$

The projections $v_L$ and $v_T$ of the speed v in the reference frame of the vehicle chassis may be given by:

$v_L = v_x(i) * \cos \psi(i) + v_y(i) * \sin \psi(i)$ $v_T(i) = -v_x(i) * \sin(i) + v_y(i) * \cos \psi(i)$ The steering angle may then be calculated:

$$\alpha(i) = \tan^{-1}\left(\frac{\omega(i) * (l_r + l_f)}{v_L(i)}\right)$$

b) Calculation of the Slip Angle $\beta$
In this section, the calculation of the lateral slip angle $\beta$ is described in detail. The chosen method takes the average lateral slip angle of the front and rear wheels.

To do this, the projections $v_{fy}$ and $v_{ry}$ on the y axis of the speeds of the front and rear wheels $v_f$ and $v_r$ respectively are calculated:

$v_{fy}(i) = (v_T(i) + l_f * \omega(i)) * \cos \alpha(i) - v_L(i) * \sin \alpha(i)$ $v_{ry}(i) = v_T(i) - l_r * \omega(i)$ $\beta$ is deduced by an equation of the form:

$$\beta(i) = \frac{\beta_f(i) + \beta_r(i)}{2} = \frac{v_{fy}(i) + v_{ry}(i)}{2 * v_L(i)}$$

Thus, by combining the equations, a dynamic model of the vehicle is obtained that links the lateral slip angle $\beta$ to the position of the vehicle.

According to a variant embodiment (which may be combined with the variant previously described), the position and altitude of the vehicle are measured, and the slip parameter determined by the dynamic model is the longitudinal slip rate SR. For this variant embodiment, the longitudinal slip rate SR may be determined by use of a mapping function for mapping the coefficient of adhesion $\mu$ of the vehicle and weather conditions (state of the road).

FIG. 4 is an example of mapping representing a plurality of curves of the coefficient of adhesion $\mu$ as a function of the longitudinal slip rate SR for a plurality of weather conditions with D being a dry road, W being a wet road, S being a snowy road, and I being an icy road. The weather conditions may be specified by the user, or may be known through the geolocation system, notably via Internet connection. Alternatively, the weather conditions may be known through sensors present on the vehicle.

For estimating the coefficient of adhesion μ, the following steps may be implemented:

a) Calculation of the Gradient Angle θ

In this section, the calculation of the gradient angle θ is described in detail.

The distance traveled at each instant is given by:

$$\Delta d(i) = \sqrt{[x_{GPS}(i) - x_{GPS}(i-1)]^2 + [y_{GPS}(i) - y_{GPS}(i-1)]^2}$$

The variation in altitude may be calculated simply via the altitude resulting from the measurements:

$$\Delta h(i) = alt_{GPS}(i) - alt_{GPS}(i-1)$$

Accordingly, the instantaneous gradient may be obtained by:

$$Slope(i) = \frac{\Delta h(i)}{\Delta d(i)}$$

According to a particular design of the invention, at this stage a running average filter may be applied on the gradient for capturing only the significant variations and limiting the noise impact.

The gradient angle may be estimated by an equation:

$$\theta(i) = \tan^{-1}(Slope)$$

b) Calculation of the Coefficient of Adhesion μ

For calculating the coefficient of adhesion μ, the tractive force at the level of the ground-wheel contact $F_{driving}$ and the normal force of gravity $F_z$ are calculated.

$$F_z = M_{vehicle} * g * \cos(\theta(i))$$

$$F_{driving}(i) = M_{vehicle} * a_{veh}(i) M_{vehicle} * g * \sin(\theta(i)) + F_{res}(v(i))$$

With $a_{veh}$ being the instantaneous acceleration of the vehicle and $F_{res}$ being the resultant of the forces of friction that apply on the vehicle, this resultant is given by the following relationship called a "road law". This term is expressed directly as a function of the speed and characteristics of the vehicle by an equation.

$$F_{res}(v) = C_{RR}k*v + \frac{1}{2} * \rho_{air} * S * C_x * v_2$$

The instantaneous acceleration of the vehicle $a_{veh}$ may be obtained (according to the available sensors) from at least one of an accelerometer and from the vehicle speed estimated from the measured position. According to one example, it may be estimated from an equation:

$$a_{veh} = \frac{v(i) - v(i-1)}{T_e}$$

The coefficient of adhesion р may be deduced by an equation:

$$\mu(i) = \frac{F_{driving}(i)}{F_z(i)}$$

Thus, by combining the equations, a dynamic model of the vehicle is obtained that links the coefficient of adhesion to the position and to the altitude of the vehicle, then the longitudinal slip rate SR is determined by use of mapping.

The method according to the invention is not limited to the model described below and other models may be implemented which notably are models taking into account the width of the vehicle.

4) Determining a Slip Parameter

In this step, at least one slip parameter of the vehicle is determined by use of the dynamic model constructed in the preceding step and by use of measurements (whether or not preprocessed) previously performed.

According to one embodiment of the invention, in this step, two slip parameters are determined which are the lateral slip angle β and the longitudinal slip rate SR (see FIGS. 1 and 2). This determination of the two slip parameters may be performed on the basis of position and altitude measurements.

From the determined lateral slip angle R, the slip of the tires is estimated by a mapping dependence on two parameters which are the coefficient of adhesion μ and the determined slip angle β. This mapping may depend on the state of the highway, in particular it is very different if the road is dry or wet (which may be judged from the weather forecast), and the state of the tires: their pressure and their wear.

According to one alternative, in this step, a single slip parameter is determined which is the lateral slip angle β. This determination may be performed on the basis of position measurements.

Alternatively, in this step, a single slip parameter is determined which is the longitudinal slip rate SR. This determination may be performed on the basis of altitude measurements, or on the basis of position and altitude measurements.

5) Determining a Dangerous Driving Indicator

This involves determining at least one dangerous driving indicator from the slip parameter or parameters determined in the preceding step. The dangerous driving indicator may take the form of a value, a grade, etc.

In accordance with one variant embodiment of the invention, the dangerous driving indicator may be determined by implementing the following steps:

at least one dangerous driving threshold (at least one threshold per parameter) is chosen for the slip parameter(s) or their derivatives;

it is determined whether the slip parameter(s) or their derivatives exceed the chosen threshold;

at least one of the number of times and the frequency (time or mileage) are quantified for which the slip parameter(s) or their derivatives have exceeded the chosen threshold; and a dangerous driving indicator is deduced from at least one of the number and/or the frequency.

Indeed, comparing the slip parameters (or their derivatives) with thresholds makes it possible to determine whether the driver is often found in adhesion limit conditions, for which loss expectancy increases.

The indicator may be the number of times or frequency of exceeding the threshold. Alternatively, the indicator may be an average value or a grade (for example out of 10)

representative of at least one of the different numbers and frequencies calculated for each slip parameter.

Once the dangerous driving indicators have been determined, this information may be at least one of recorded and transmitted to the driver (or to any other person) by use of a display. This at least one of recording and display may be performed on board the vehicle: on the dashboard, on a standalone portable device, such as a geolocation device (of the GPS type), or a mobile phone (of the smartphone type). It is also possible to record and display this indicator on an Internet site, that the driver may consult subsequently to their driving. In addition, this or these dangerous driving indicator(s) may be shared with an insurance, car-sharing, car rental organization, a vehicle fleet manager, etc. so as to indicate whether or not their client's driving is dangerous, so that they may adapt their services of insurance costs, rental charges, etc.

The present invention also relates to a method for controlling a vehicle, in which the following steps are performed:

at least one dangerous driving indicator is determined by use of the previously described method; and the control of the vehicle is adapted according to the dangerous driving indicator. This adaptation may be performed directly by the driver who becomes aware of the dangerousness of their driving, or may be performed by a controller of the vehicle that limits dangerous situations.

The method according to the invention may be used for motor vehicles. However, it may be used in the field of road transport, the field of two-wheeled vehicles, the railroad field, the naval field, the aeronautics field, the hovercraft field, and the field of amphibious vehicles, etc.

The invention further relates to a computer program product which is at least one of downloadable from a communication network recorded on a tangible computer-readable medium and executable by a processor or a server. This program includes program code instructions for implementing the method as described above, when the program is executed on a computer or a mobile phone.

Illustrative Examples

The objective of these examples is to compare the actual measured slip with the estimate performed following the previously described method.

The tests are three "Wide Open Throttle" accelerations in 1st, 2nd and 3rd gear, as illustrated in FIGS. 5a through 5d, which respectively represent the speed of the vehicle $v_{vh}$, the gear ratio RBV, the engine speed $N_e$, and the position of the accelerator pedal $P_{acc}$. In these tests, the acceleration of the vehicle is at the maximum since the combustion engine is used at its maximum torque. Accordingly, a longitudinal slip is inevitable.

Figure 6:
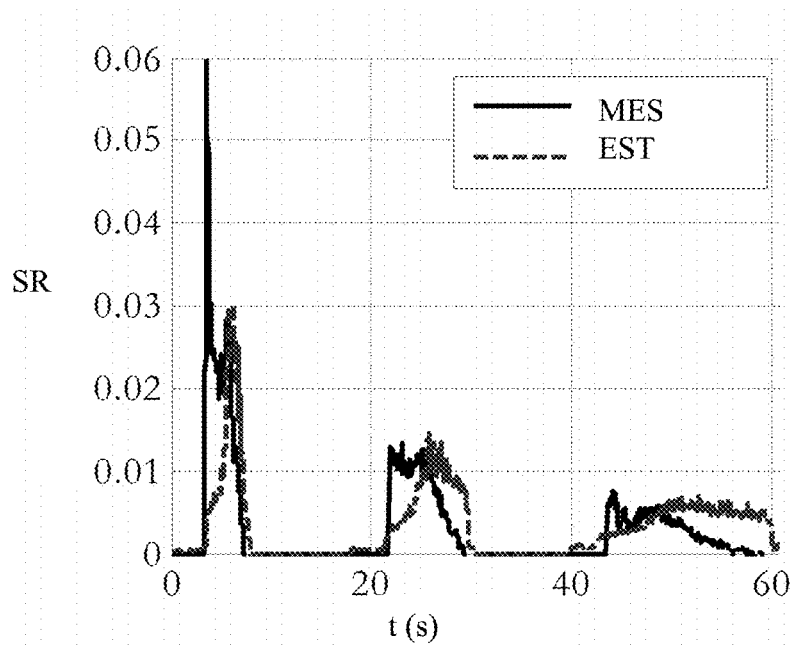
FIG. 6 illustrates curves for the estimated longitudinal slip ratio and the measured slip ratio as a function of time, for the tests according to FIG. 5.

The results of the estimate EST according to the method according to the invention, and of the measurements MES of the longitudinal slip SR are given in FIG. 6. It can be seen that in spite of the very small number of measurements used for estimating (only the position and altitude derived from a geolocation system), the phases where slip occurs can be identified. In addition, the slip amplitude also succeeds in being estimated which is most logically more important on the first gears.

Figure 7:
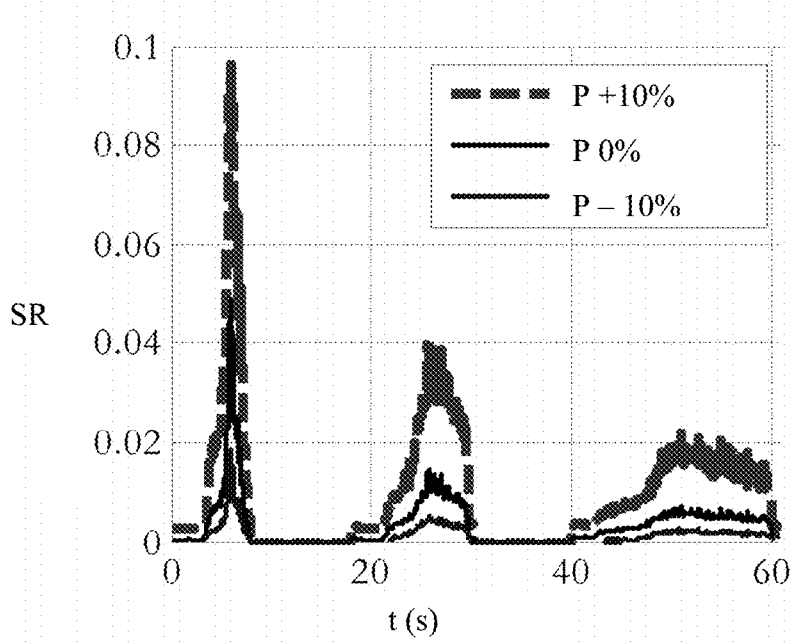
FIG. 7 illustrates the curves for the longitudinal slip rate of the vehicle as a function of the coefficient of time and gradient.

One of the added values of the present invention is that it takes into account the gradient in the slip estimate. FIG. 7 depicts the impact of the gradient P on the longitudinal slip rate SR. This still involves the same test case (FIGS. 5a through 5d) and the effect of the gradient is obtained in simulation. For these tests, the gradient P is varied from −10% to +10% passing through 0%. A significant impact of the gradient is seen on the slip estimate. Accordingly, taking it into account is very advantageous. Otherwise, the characterization of dangerous driving is distorted when the road has a significant gradient.

The invention claimed is:

1. A method of determining at least one dangerous driving indicator of a vehicle, comprising:
   a) measuring at least one of position and altitude of the vehicle;
   b) constructing a dynamic model of the vehicle linking at least one of the position and the altitude of the vehicle to at least one slip parameter of the vehicle;
   c) determining the at least one slip parameter of the vehicle by use of the dynamic model and at least one of the measured position and the altitude; and
   d) determining at least one dangerous driving indicator of the vehicle by use of the at least one slip parameter; and wherein
   the at least one dangerous indicator is determined by at least one of a number of times and frequency exceeding at least one threshold by the slip parameter.

2. The method as claimed in claim 1, comprising using a geolocation system to measure at least one of the altitude or the position of the vehicle.

3. The method as claimed in claim 2, comprising determining the dangerous driving indicator by determining at least one of a number of times and a frequency of exceeding at least one threshold by the slip parameter.

4. The method as claimed in claim 1, comprising preprocessing at least one of the measurements of the position and the altitude prior to determining the at least one slip parameter.

5. The method as claimed in claim 4, comprising determining the dangerous driving indicator by determining at least one of a number of times and a frequency of exceeding at least one threshold by the slip parameter.

6. The method as claimed in claim 4, wherein the preprocessing comprises using at least one of oversampling and filtering.

7. The method as claimed in claim 1, wherein the dynamic model of the vehicle is a model which disregards width of the vehicle.

8. The method as claimed in claim 7, comprising determining the dangerous driving indicator by determining at least one of a number of times and a frequency of exceeding at least one threshold by the slip parameter.

9. The method as claimed in claim 1, wherein the at least slip parameter of the vehicle is at least one of lateral slip angle of the vehicle and longitudinal slip rate of the vehicle.

10. The method as claimed in claim 9, wherein the dynamic model of the vehicle determines the lateral slip angle β by a formula:

$$\beta(i) = \frac{v_{fy}(i) + v_{ry}(i)}{2 * v_L(i)}$$

with:
   i being an instant of calculation,
   $v_{fy}$ being a projection on an axis of speed of a front wheel of the vehicle,
   $v_{ry}$ being a projection on an axis of speed of a rear wheel of the vehicle, and $v_L$ being a projection on a longitudinal axis of the vehicle of speed of the vehicle with the projection of the speeds being a function of the position of the vehicle.

11. The method as claimed in claim 10, wherein the projection of the speeds are determined by relationship:

$$v_{ry}(i) = v_T(i) - l_r * \omega(i),$$

$$v_{fy}(i) = (v_T(i) + l_f * \omega(i)) * \cos\alpha(i) - v_L(i) * \sin\alpha(i),$$

$$\alpha(i) = \tan^{-1}\left(\frac{\omega(i) * (l_r + l_f)}{v_L(i)}\right),$$

$$v_L(i) = v_x(i) * \cos\psi(i) + v_y(i) * \sin\psi(i),$$

$$v_T(i) = -v_x(i) * \sin\psi(i) + v_y(i) * \cos\psi(i),$$

$$v_x(i) = \frac{x_{GPS}(i) - x_{GPS}(i-1)}{T_e},$$

$$v_y(i) = \frac{y_{GPS}(i) - y_{GPS}(i-1)}{T_e},$$

$$\omega(i) = \frac{\psi(i) - \psi(i-1)}{T_e},$$

$$\psi(i) = \frac{180}{\pi} * \tan^{-1}\left(\frac{x_{GPS}(i) - x_{GPS}(i-1)}{y_{GPS}(i) - y_{GPS}(i-1)}\right),$$

with $x_{GPS}, y_{GPS}$ being coordinates of the vehicle in a Lambert coordinate system which correspond to a measured position of the vehicle;

i being an instant of calculation;

$T_e$ being a sampling period;

$l_f$ being a distance between a center of gravity and front wheels of the vehicle; and $l_r$ being a distance between a center of gravity of the vehicle and rear wheels of the vehicle.

12. The method as claimed in claim 11, wherein the dynamic model determines a clip rate SR of the vehicle by use of a mapping function for mapping a coefficient of adhesion μ of the vehicle and weather conditions.

13. The method as claimed in claim 10, wherein the dynamic model determines a clip rate SR of the vehicle by use of a mapping function for mapping a coefficient of adhesion μ of the vehicle and weather conditions.

14. The method as claimed in claim 9, wherein the dynamic model determines a clip rate SR of the vehicle by use of a mapping function for mapping a coefficient of adhesion μ of the vehicle and weather conditions.

15. The method as claimed in claim 14, wherein the coefficient of adhesion p of the vehicle is determined by a formula:

$$\mu(i) = \frac{F_{driving}(i)}{F_z(i)}$$

with:

$$F_{res}(v) = C_{RR} + k * v + \frac{1}{2} * \rho_{air} * S * C_x * v^2,$$

$$F_{driving}(i) = M_{vehicle} * a_{veh}(i) + M_{vehicle} * g * \sin(\theta(i)) + F_{res}(v(i)),$$

$$F_z(i) = M_{vehicle} * g * \cos(\theta(i)),$$

$$\theta(i) = \tan^{-1}(\text{Slope}),$$

$$\text{Slope}(i) = \frac{\Delta h(i)}{\Delta d(i)},$$

$$\Delta h(i) = alt_{GPS}(i) - alt_{GPS}(i-1),$$

$$\Delta d(i) = \sqrt{[x_{GPS}(i) - x_{GPS}(i-1)]^2 + [y_{GPS}(i) - y_{GPS}(i-1)]^2},$$

with:

$x_{GPS}, y_{GPS}$ being coordinates of the vehicle in the Lambert coordinate system, corresponding to the measured position of the vehicle, $alt_{GPS}$ being measured altitude of the vehicle, i being an instant of calculation, $a_{veh}$ being acceleration of the vehicle, $M_{vehicle}$ being mass of the vehicle, $\rho_{air}$ being density of the air, s being a front surface area of the vehicle, $c_x$ being a front aerodynamic drag coefficient of the vehicle, k being a coefficient of viscous friction, $C_{RR}$ being a rolling resistance coefficient of the vehicle, and g being acceleration of gravity.

16. The method as claimed in claim 1, comprising determining the dangerous driving indicator by determining at least one of a number of times and a frequency of exceeding at least one threshold by the slip parameter.

17. The method as claimed in claim 1, wherein the at least one dangerous driving indicator is at least one of being displayed and being recorded while the vehicle is being driven.

18. The method as claimed in claim 17, wherein the at least one dangerous driving indicator is at least one of being displayed recorded on the dashboard of the vehicle, on an Internet site, on geolocation system or a mobile phone.

19. The method as claimed in claim 1, wherein the dynamic model of the vehicle accounts for at least one of a state of the highway, weather conditions, pressure and state of wear of the vehicle's tires by use of mapping.

20. The method for controlling a vehicle, comprising:
   a) at least one dangerous driving indicator is determined according to claim 1; and
   b) the control of the vehicle is changed according to the dangerous driving indicator.

21. A computer program product recorded on a tangible non-transitory computer-readable medium which is executable by a processor, comprising program code instructions for implementing the method according to claim 1.

* * * * *